United States Patent
Ofosu et al.

(10) Patent No.: US 6,268,302 B1
(45) Date of Patent: *Jul. 31, 2001

(54) HIGH STRENGTH SPUNBOND FABRIC FROM HIGH MELT FLOW RATE POLYMERS

(75) Inventors: Simon Kwame Ofosu, Lilburn; Peter Michailovich Kobylivker, Marietta; Mary Lou DeLucia; Robert Leslie Hudson, both of Roswell; John Joseph Sayovitz, Marietta, all of GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/832,481

(22) Filed: Apr. 2, 1997

Related U.S. Application Data

(63) Continuation of application No. 08/639,853, filed on Apr. 19, 1996, now Pat. No. 5,681,646, which is a continuation-in-part of application No. 08/341,799, filed on Nov. 18, 1994, now abandoned.

(51) Int. Cl.[7] .................................................. B32B 27/14
(52) U.S. Cl. ..................... 442/407; 442/395; 442/398; 442/400; 442/401; 442/403; 442/415
(58) Field of Search .................................. 442/395, 398, 442/400, 401, 403, 407, 415

(56) References Cited

U.S. PATENT DOCUMENTS

| | | | |
|---|---|---|---|
| 3,338,992 | 8/1967 | Kinney | 264/24 |
| 3,341,394 | 9/1967 | Kinney | 161/72 |
| 3,502,763 | 3/1970 | Hartmann | 264/210 |
| 3,542,615 | 11/1970 | Dobo et al. | 156/181 |
| 3,692,618 | 9/1972 | Dorschner et al. | 161/72 |
| 3,795,571 | 3/1974 | Prentice | 161/148 |
| 3,802,817 | 4/1974 | Matsuki et al. | 425/66 |
| 3,849,241 | 11/1974 | Butin et al. | 161/169 |
| 3,849,361 | 11/1974 | Zweigle | 260/33.2 R |
| 3,855,046 | 12/1974 | Hansen et al. | 161/150 |
| 3,959,054 | 5/1976 | Pietsch et al. | 156/148 |
| 4,013,816 | 3/1977 | Sabee et al. | 428/288 |
| 4,041,203 | 8/1977 | Brock et al. | 4288/157 |
| 4,131,704 | 12/1978 | Erickson et al. | 428/95 |
| 4,288,484 | 9/1981 | Norota et al. | 4288/113 |
| 4,297,408 | 10/1981 | Stead et al. | 428/240 |
| 4,310,594 | 1/1982 | Yamazaki et al. | 428/296 |
| 4,315,695 | 2/1982 | Mason et al. | 428/198 |
| 4,340,563 | 7/1982 | Appel et al. | 264/518 |
| 4,373,000 | 2/1983 | Knoke et al. | 428/198 |
| 4,374,888 | 2/1983 | Bornslaeger | 4288/198 |
| 4,434,204 | 2/1984 | Hartman et al. | 428/198 |
| 4,443,513 | 4/1984 | Meitner et al. | 422/195 |
| 4,451,589 | 5/1984 | Morman et al. | 523/124 |
| 4,477,515 | 10/1984 | Masuda et al. | 428/288 |
| 4,483,897 | 11/1984 | Fujimura et al. | 428/288 |
| 4,493,868 | 1/1985 | Meitner | 428/171 |
| 4,496,508 | 1/1985 | Hartmann et al. | 264/167 |
| 4,508,113 | 4/1985 | Malaney | 128/132 D |
| 4,511,615 | 4/1985 | Ohta | 428/198 |
| 4,522,203 | 6/1985 | Mays | 128/132 D |
| 4,542,060 | 9/1985 | Yoshida et al. | 428/287 |
| 4,663,220 | 5/1987 | Wisneski et al. | 428/221 |
| 4,684,570 | 8/1987 | Malaney | 428/296 |
| 4,766,029 | 8/1988 | Brock et al. | 428/286 |
| 4,769,279 | 9/1988 | Graham | 428/296 |
| 4,804,577 | 2/1989 | Hazelton et al. | 428/224 |
| 4,854,984 | 8/1989 | Ball et al. | 156/73.5 |
| 4,877,679 | 10/1989 | Leatherman et al. | 428/224 |
| 4,919,738 | 4/1990 | Ball et al. | 156/73.5 |
| 4,933,229 | 6/1990 | Insley et al. | 428/224 |
| 4,966,809 | 10/1990 | Tanaka et al. | 428/323 |
| 4,980,227 | 12/1990 | Sekiguchi et al. | 428/241 |
| 4,988,560 | 1/1991 | Meyer et al. | 428/297 |
| 5,039,431 | 8/1991 | Johnson et al. | 264/113 |
| 5,059,277 | 10/1991 | Willhite, Jr. et al. | 156/580.1 |
| 5,073,436 | 12/1991 | Antonacci et al. | 428/219 |
| 5,093,197 | 3/1992 | Howard et al. | 428/372 |
| 5,108,820 | 4/1992 | Kaneko et al. | 428/198 |
| 5,108,827 | 4/1992 | Gessner | 428/219 |
| 5,114,787 | 5/1992 | Chaplin et al. | 428/284 |
| 5,126,201 | 6/1992 | Shiba et al. | 428/389 |
| 5,169,706 | 12/1992 | Collier, IV et al. | 428/152 |

(List continued on next page.)

FOREIGN PATENT DOCUMENTS

| | | |
|---|---|---|
| 310200 | 4/1989 | (EP) . |
| 586924 | 3/1994 | (EP) . |

OTHER PUBLICATIONS

*Polymer Blends and Composites* by John A. Manson and Leslie H. Sperling, Plenum Press, New York, Copyright 1976, IBN–0–30–6–30831–2, pp. 273–277.

*Primary Examiner*—Helen L. Pezzuto
(74) *Attorney, Agent, or Firm*—Douglas H. Tulley, Jr.; Ralph H. Dean, Jr.

(57) ABSTRACT

A spunbond nonwoven fabric is provided which has superior strength characteristics to conventional fabrics yet is comparably soft. The fabric is a laminate having a web made from a high melt flow rate polyolefin polymer and a low melt flow rate polymer. The spunbond laminate fabric of this invention may have therebetween a layer of meltblown nonwoven fabric or film. The laminate produced according to this invention has a strength which is at least 10% greater than a comparable fabric made without the high melt flow rate polymer web.

The nonwoven fabric of this invention may be used in products such as, for example, garments, personal care products, medical products, protective covers and outdoor fabrics.

8 Claims, No Drawings

U.S. PATENT DOCUMENTS

| | | | |
|---|---|---|---|
| 5,173,356 | 12/1992 | Eaton et al. | 428/219 |
| 5,176,952 | 1/1993 | Joseph et al. | 428/284 |
| 5,182,162 | 1/1993 | Andrusko | 428/219 |
| 5,188,885 | 2/1993 | Timmons et al. | 428/198 |
| 5,204,174 | 4/1993 | Daponte et al. | 428/286 |
| 5,213,881 | 5/1993 | Timmons et al. | 428/224 |
| 5,227,227 | 7/1993 | Boulanger | 428/224 |
| 5,230,949 | 7/1993 | Howard et al. | 428/224 |
| 5,232,770 | 8/1993 | Joseph | 428/284 |
| 5,238,733 | 8/1993 | Joseph et al. | 428/284 |
| 5,244,724 | 9/1993 | Antonacci et al. | 428/288 |
| 5,258,220 | 11/1993 | Joseph | 428/284 |
| 5,275,884 | 1/1994 | Nishino et al. | 428/374 |
| 5,306,545 | 4/1994 | Shirayanagi et al. | 428/198 |
| 5,336,552 | 8/1994 | Strack et al. | 428/224 |

HIGH STRENGTH SPUNBOND FABRIC FROM HIGH MELT FLOW RATE POLYMERS

This application is a continuation of application Ser. No. 08/639,853 entitled "HIGH STRENGTH SPUNBOND FABRIC FROM HIGH MELT FLOW RATE POLYMERS" and filed in the U.S. Patent and Trademark Office on Apr. 19, 1996 now U.S. Pat. No. 5,681,646, which is itself a Continuation-in-Part of application Ser. No. 08/341,799 filed Nov. 18, 1994, now abandoned. The entirety of these Applications are hereby incorporated by reference.

BACKGROUND OF THE INVENTION

This invention relates generally to a nonwoven fabric or web which is formed from spunbond fibers of a thermoplastic resin and laminates using such a web as a component.

Thermoplastic resins have been extruded to form fibers, fabrics and webs for a number of years. The most common thermoplastics for this application are polyolefins, particularly polypropylene. Other materials such as polyesters, polyetheresters, polyamides and polyurethanes are also used to form spunbond fabrics.

Nonwoven fabrics or webs are useful for a wide variety of applications such as diapers, feminine hygiene products, towels, and recreational or protective fabrics. The nonwoven fabrics used in these applications are often in the form of laminates like spunbond/spunbond (SS) laminates or spunbond/meltblown/spunbond (SMS) laminates.

One of the desired characteristics of nonwoven fabrics is that they be as soft as possible. Previously, improving softness has generally involved a trade-off with other desirable properties of the web such as tensile strength. For example, polyethylene webs are very soft but also quite weak.

It is an object of this invention to provide a spunbond polyolefin nonwoven fabric or web which is softer than those conventionally produced but which has comparable strength characteristics.

SUMMARY OF THE INVENTION

A soft and strong nonwoven spunbond polyolefin fabric is provided which is a multilayer laminate of a first web of high melt flow polymer fibers and a second web of low melt flow polymer fibers. The web of low melt flow polymer fibers is produced from polyolefin polymer having a melt flow rate of below 50 grams/10 minutes at 230° C. The web of high melt flow polymer fibers is produced from polyolefin polymer having a melt flow rate of at least 50 grams/10 minutes at 230° C. wherein the polyolefin polymer is initially produced as a reactor granule through the use of a Ziegler-Natta catalyst with a melt flow rate below 50 grams/10 minutes at 230° C. and subsequently modified by a method such as the addition of up to 1000 ppm of peroxide, the addition of up to 5 weight percent of an organo-metallic compound and the addition of up to 5 weight percent of a transition metal oxide. This treatment increases the melt flow rate of the polymer by a factor of at least two. Such a laminate has a tensile strength of at least 10% greater than a similar laminate made without a high melt flow rate web but instead with a web of the same type as the second web. The fabric of this invention may also have various layers disposed between the first and second webs.

The nonwoven fabric of this invention may be used in products such as, for example, garments, personal care products, medical products, protective covers and outdoor fabrics.

In a further aspect a soft and strong nonwoven spunbond polyolefin fabric is provided comprising: a first web of spunbond fibers produced from a polyolefin polymer having a melt flow rate of at least 50 grams/10 minutes according to ASTM D-1238-90b condition L and a viscosity of at least 2500 dynes.sec/cm$^2$ and; a second web of spunbond fibers produced from a polyolefin polymer having a melt flow rate below 50 grams/1 0 minutes according to ASTM D-1238-90b condition L wherein said webs are bonded together to form a laminate having a strength at least 10% greater than the same laminate made when the first web polymer melt flow rate does not exceed 50 grams/10 minutes according to ASTM D-1238-90b condition L. In addition, the fabric may further comprise a third layer selected from the group consisting of meltblown webs and films disposed between the first and second webs. In a further aspect, the meltblown web or film may be made from fiber forming or film forming polymers, respectively, selected from the group consisting of polyurethanes, polyetheresters, polyamides, polyolefins, polyolefin copolymers and mixtures thereof

DEFINITIONS

As used herein the term "nonwoven fabric or web" means a web having a structure of individual fibers or threads which are interlaid, but not in an identifiable manner as in a knitted fabric. Nonwoven fabrics or webs have been formed from many processes such as for example, meltblowing processes, spunbonding processes, and bonded carded web processes. The basis weight of nonwoven fabrics is usually expressed in ounces of material per square yard (osy) or grams per square meter (gsm) and the fiber diameters useful are usually expressed in microns. (Note that to convert from osy to gsm, multiply osy by 33.91).

As used herein the term "microfibers" means small diameter fibers having an average diameter not greater than about 75 microns, for example, having an average diameter of from about 0.5 microns to about 50 microns, or more particularly, microfibers may have an average diameter of from about 2 microns to about 40 microns. The diameter of, for example, a polypropylene fiber given in microns, may be converted to denier by squaring, and multiplying the result by 0.00629, thus, a 15 micron polypropylene fiber has a denier of about 1.42 (15$^2$×0.00629=1.415).

As used herein the term "spunbonded fibers" refers to small diameter fibers which are formed by extruding molten thermoplastic material as filaments from a plurality of fine, usually circular capillaries of a spinnerette with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. Nos. 3,502,763, and U.S. Pat. No. 3,542,615 to Dobo et al. Spunbond fibers are generally continuous and larger than 7 microns, more particularly, they are usually between about 15 and 50 microns.

As used herein the term "meltblown fibers" means fibers formed by extruding a molten thermoplastic material through a plurality of fine, usually circular, die capillaries as molten threads or filaments into a high velocity gas (e.g. air) stream which attenuates the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin. Meltblown fibers are microfibers which are generally smaller than 10 microns in diameter. The term meltblowing used herein is meant to encompass the meltspray process.

As used herein the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configuration of the material. These configurations include, but are not limited to isotactic, syndiotactic and random symmetries.

As used herein the term "bicomponent fibers" refers to fibers which have been formed from at least two polymers extruded from separate extruders but spun together to form one fiber. The polymers are arranged in substantially constantly positioned distinct zones across the cross-section of the bicomponent fibers and extend continuously along the length of the bicomponent fibers. The configuration of such a bicomponent fiber may be, for example, a sheath/core arrangement wherein one polymer is surrounded by another or may be a side by side arrangement or an "islands-in-the-sea" arrangement. Bicomponent fibers are taught in U.S. Pat. No. 5,108,820 to Kaneko et al., U.S. Pat. No. 5,336,552 to Strack et al., and European Patent 0586924. The polymers may be present in ratios of 75/25, 50/50, 25/75 or any other desired ratios.

As used herein the term "biconstituent fibers" refers to fibers which have been formed from at least two polymers extruded from the same extruder as a blend. The term "blend" is defined below. Biconstituent fibers do not have the various polymer components arranged in relatively constantly positioned distinct zones across the cross-sectional area of the fiber and the various polymers are usually not continuous along the entire length of the fiber, instead usually forming fibrils which start and end at random. Biconstituent fibers are sometimes also referred to as multiconstituent fibers. Fibers of this general type are discussed in, for example, U.S. Pat. No. 5,108,827 to Gessner. Bicomponent and biconstituent fibers are also discussed in the textbook *Polymer Blends and Composites* by John A. Manson and Leslie H. Sperling, copyright 1976 by Plenum Press, a division of Plenum Publishing Corporation of New York, IBSN 0-306-30831-2, at pages 273 through 277.

As used herein the term "blend" means a mixture of two or more polymers while the term "alloy" means a sub-class of blends wherein the components are immiscible but have been compatibilized. "Miscibility" and "immiscibility" are defined as blends having negative and positive values, respectively, for the free energy of mixing. Further, "compatibilization" is defined as the process of modifying the interfacial properties of an immiscible polymer blend in order to make an alloy.

As used herein the term "prodegradant" refers to materials which promote the degradation of the melt flow of a polymer from low melt flow rate to high melt flow rate.

As used herein, the term "garment" means any type of apparel which may be worn. This includes industrial work wear and coveralls, undergarments, pants, shirts, jackets, gloves, socks, and the like.

As used herein, the term "medical product" means surgical gowns and drapes, face masks, head coverings, shoe coverings wound dressings, bandages, sterilization wraps, wipers and the like.

As used herein, the term "personal care product" means diapers, training pants, absorbent underpants, adult incontinence products, and feminine hygiene products.

As used herein, the term "protective cover" means a cover for vehicles such as cars, trucks, boats, airplanes, motorcycles, bicycles, golf carts, etc., covers for equipment often left outdoors like grills, yard and garden equipment (mowers, roto-tillers, etc.) and lawn furniture, as well as floor coverings, table cloths and picnic area covers.

As used herein, the term "outdoor fabric" means a fabric which is primarily, though not exclusively, used outdoors. Outdoor fabric includes fabric used in protective covers, camper/trailer fabric, tarpaulins, awnings, canopies, tents, agricultural fabrics and outdoor apparel such as head coverings, industrial work wear and coveralls, pants, shirts, jackets, gloves, socks, shoe coverings, and the like.

TEST METHODS

Handle-O-Meter: The softness of a nonwoven fabric may be measured according to the "Handle-O-Meter" test. The test used herein is the INDA standard test 1st 90.0-75 (R 82) with two modifications: 1. the specimen size was 4 inches by 4 inches and 2. five specimens were tested rather than two. The test was carried out on Handle-O-Meter model number 211-5 from the Thwing-Albert Instrument Co., 10960 Dutton Road, Phila. Pa. 19154. The Handle-O-Meter reading is in units of grams.

Tensile: The tensile strength of a fabric may be measured according to the ASTM test D-1682-64. This test measures the strength in pounds and elongation in percent of a fabric.

Melt Flow Rate: The melt flow rate (MFR) is a measure of the viscosity of a polymers. The MFR is expressed as the weight of material which flows from a capillary of known dimensions under a specified load or shear rate for a measured period of time and is measured in grams/10 minutes at 230° C. according to, for example, ASTM test 1238, condition E.

DETAILED DESCRIPTION

The important properties of polyolefins used in the spunbonding process are known to those skilled in the art. The melt flow rate and the viscosity are interrelated and are quite important in characterizing a polymer. The melt flow rate is related to the viscosity of the polymer with a higher number indicating a lower viscosity. The test for the melt flow rate is defined above.

The spunbond process generally uses a hopper which supplies polymer to a heated extruder. The extruder supplies melted polymer to a spinnerette where the polymer is fiberized as it passes through fine openings arranged in one or more rows in the spinnerette, forming a curtain of filaments. The filaments are usually quenched with air at a low pressure, drawn, usually pneumatically and deposited on a moving foraminous mat, belt or "forming wire" to form the nonwoven fabric. Polymers useful in the spunbond process generally have a process melt temperature of between about 400° F. to about 610° F. (200° C. to 320° C.).

The fibers produced in the spunbond process are usually in the range of from about 15 to about 50 microns in diameter, depending on process conditions and the desired end use for the fabrics to be produced from such fibers. For example, increasing the polymer molecular weight or decreasing the processing temperature results in larger diameter fibers. Changes in the quench fluid temperature and pneumatic draw pressure can also affect fiber diameter. In this invention, the particular polymer used allows the fibers to be produced at a smaller diameter than usual for spunbonding.

The fabric of this invention is a multilayer laminate incorporating the high melt flow polymer fiber web and may be formed by a number of different techniques including but not limited to using adhesive, needle punching, ultrasonic bonding, thermal calendering and any other method known in the art. Such a multilayer laminate may be an embodiment wherein some of the layers are spunbond and some meltblown such as a spunbond/meltblown/spunbond (SMS) laminate as disclosed in U.S. Pat. No. 4,041,203 to Brock et al. and U.S. Pat. No. 5,169,706 to Collier, et al. or as a spunbond/spunbond laminate. An SMS laminate may be made by sequentially depositing onto a moving conveyor belt or forming wire first a spunbond fabric layer, then a meltblown fabric layer and last another spunbond layer and then bonding the laminate in a manner described above. Alternatively, the three fabric layers may be made individually, collected in rolls, and combined in a separate bonding step.

Various patterns for calender rolls have been developed. One example is the expanded Hansen Pennings pattern with about a 15% bond area with about 100 bonds/square inch as taught in U.S. Pat. No. 3,855,046 to Hansen and Pennings. Another common pattern is a diamond pattern with repeating and slightly offset diamonds.

The fabric of this invention may also be laminated with films, glass fibers, staple fibers, paper, and other commonly used materials known to those skilled in the art. Areas in which the fabric of this invention may find utility are garments, medical products, personal care products, and outdoor fabrics. More particularly, fabrics produced according to this invention are useful in heavier basis weight applications such as protective covers. Protective covers usually have basis weights ranging from about 2 osy (68 gsm) to about 8 osy (271 gsm), according, a fabric produced according to this invention will preferably have basis weights ranging from about 0.2 osy (7 gsm) to about 3 osy (102 gsm).

A polyolefin polymer useful in this invention must have a high melt flow rate and low viscosity. The melt flow rate desired for the polyolefin to be used in this invention is at least 50 gms/10 min at 230° C., and preferably in the range from about 50 gms/10 min at 230° C. to about 150 gms/10 min at 230° C. The viscosity of the polymer is measured at 180° C. and must be at least $2.5 \times 10^3$ dynes.sec/cm$^2$ and preferably in the range of about $2.5 \times 10^3$ dynes.sec/cm$^2$ to about $6.5 \times 10^3$ dynes.sec/cm$^2$. The high melt flow rate and low viscosity allows the fibers to be drawn more highly than otherwise, producing very fine spunbond fibers. Fibers produced with the high melt flow polyolefin employed herein are in the range of about 11 to about 20 microns in diameter.

One advantage of fine spunbond fibers may be seen in non-adhesive where energy is applied to the web through various means to induce the fibers to melt together slightly. It is believed by the inventors that smaller fibers made from lower viscosity polymers enable more polymer to flow at the bond points during bonding, thus ensuring a strong bond, yet the web retains the advantage of softness which smaller fibers also give.

The production of a high melt flow rate polyolefin may be achieved when starting with a conventional low melt flow polyolefin through the action of free radicals which degrade the polymer from low to high melt flow. Such free radicals can be created and/or rendered more stable through the use of a prodegradant such as a peroxide, an organo-metallic compound or a transition metal oxide. Depending on the prodegradant chosen, stabilizers may be useful.

One example of a way to make a high melt flow polyolefin from a conventional low melt flow polyolefin is to incorporate a peroxide into the polymer.

Peroxide addition to a polymer for meltblowing applications is taught in U.S. Pat. No. 5,213,881 to Timmons et al. In Timmons, up to about 3000 ppm of peroxide is added to a polymer which has been polymerized with a Ziegler-Natta catalyst. The polymer is in the form of reactor granules and has a molecular weight distribution of 4.0 to 4.5 Mw/Mn and a melt flow rate of about 400 gms/10 min at 230° C. prior to modification. Such a polymer is modified by the peroxide to have a molecular weight distribution in the range of about 2.2 to 3.5 Mw/Mn and a melt flow rate of about 800 to 5000 gms/10 min at 230° C. Peroxide addition to polymer pellets is also addressed in U.S. Pat. No. 4,451,589 to Morman et al.

Peroxide addition to a polymer for spunbonding applications is done by adding up to 1000 ppm of peroxide to commercially available low melt flow rate polyolefin polymer and mixing thoroughly. The resulting modified polymer will have a melt flow rate of approximately two to three times that of the starting polymer, depending upon the rate of peroxide addition and mixing time.

Another way to make a high melt flow polyolefin from a conventional low melt flow polyolefin is to add an organo-metallic compound to the polyolefin. The organo-metallic compound has the effect of increasing the stability of free radicals within the polymer which allows them to remain active for a longer period of time, and thus to degrade the polymer from low to high melt flow. Typically, the melt flow may be changed from about 35 to the range of about 70 to 85 using this method.

Suitable organo-metallic compounds are, for example, sodium bis(para-t-butylphenyl) phosphate, and sodium bis (para-t-butyl) silicate. An example of a suitable commercially available organo-metallic compound is that sold by Witco Chemical Company of New Jersey under the trade name Mark 2180. When an organo-metallic compound is used it may be used in an amount of from about 0.1 weight percent to about 5 weight percent. Other such organo-metallic compounds normally sold as pigments are available from the Standridge Chemical Company of Social Circle, Georgia. One such material is pthalo-$Fe_2O_3$-cynanine and is a blue-grey pigment. Organo-metallic compounds have the added benefit of giving the fabric enhanced ultraviolet light resistance, important in outdoor applications, as well as giving color to the fabric, as most organo-metallic compounds are also pigments.

The organo-metallic compound may be added to the polyolefin to be spun prior to entering the extruder. It is important that the organo-metallic compound and the polyolefin be mixed as thoroughly as possible in order to provide as uniform a mixture as possible to the spinnerette. Uniformity in the composition fed to the spinnerette helps to ensure uniform fiber production and to reduce broken fibers and shot. One suitable method of mixing the polyolefin and organo-metallic compound is to add the organo-metallic compound, generally a powder, to the polyolefin, generally in pellet form, in a large mixing vessel prior to addition to the hopper as described previously. Alternatively, the organo-metallic compound may be added to the polyolefin in the hopper.

Still another method is to add the organo-metallic compound in a controlled manner at a number of points along the length of the extruder as the polyolefin is melted and moved forward toward the spinnerette. This method would allow the greatest controllability of the process yet also provides the least margin for error in the addition rate, as changes in the addition rate would most immediately affect the uniformity of the fibers produced.

Yet another way to make a high melt flow polyolefin from a conventional low melt flow polyolefin is to add a transition metal oxide to the polymer during processing. Suitable transition metal oxides are, for example, ferric oxides, aluminum oxides or magnesium oxides. An example of a suitable commercially available transition metal oxide is that sold by Engelhard Corporation under the trade name Fe-0301-P. When a transition metal oxide is used it may be used in an amount of from about 0.1 weight percent to about 5 weight percent. Transition metal oxides may be added to the polyolefin in the manner described above. Transition metal oxides have the added benefit of giving the fabric enhanced ultraviolet light resistance, important in outdoor applications, as well as giving color to the fabric, as most transition metal oxides are also pigments.

It is also believed that a combination of a number of the above techniques will also be successful in producing polyolefin of the desired melt flow rate.

The polyolefin useful in this invention may be polyethylene, polypropylene, polybutylene or copolymer and mixtures thereof. Polypropylene is preferred.

In addition to the above methods, high melt flow polypropylenes are commercially available from Shell Chemical Co., Houston, Tex. as WRD5-1131, WRD5-1155 through 1157, WRD5-1160 through 1162, from Exxon Chemical Co., Baytown, Tex. as PLTD-739, PLTD-766, PLTD-782, PLTD 926, PLTD-927 and others, and from the Himont Corporation of Wilmington, Del. as X11029-20-1 and X1129-20-2. These materials have melt flow rates of above 60.

The modified polymers employed in the practice of this invention provide not only a high melt flow rate, but are also believed to be responsible for the higher strength in the resulting fabric after bonding. Thus, it has been surprisingly found that the fabric of this invention has a tensile strength of at least 10% more than the fabric made from the same polymer without modification to a high melt flow rate.

While the fabric made from the high melt flow rate polymer fibers described above may be used in a laminate with only a low melt flow rate polymer web, it is preferred that the fabric be laminated to other materials as well. Such materials include meltblown webs, films and other spunbond webs.

Films, and meltblown & spunbond webs may be made from any material known in the art to be suitable for such applications. This includes polyamides, polyethers, polyetheresters, polyurethanes, polyolefins and copolymers, terpolymers and mixtures thereof. Webs may be made of fibers constructed in a bicomponent configuration as defined above. Elastomeric thermoplastic polymers may be used to form such films and webs also. Elastomeric polymers are preferably selected from those made from styrenic block copolymers, polyurethanes, polyamides, copolyesters, ethylene vinyl acetates (EVA) and the like.

Styrenic block copolymers include styrene/butadiene/styrene (SBS) block copolymers, styrene/isoprene/styrene (SIS) block copolymers, styrene/ethylene-propylene/styrene (SEPS) block copolymers, styrene/ethylene-butadiene/styrene (SEBS) block copolymers. For example, useful elastomeric fiber forming resins include block copolymers having the general formula A-B-A' or A-B, where A and A' are each a thermoplastic polymer endblock which contains a styrenic moiety such as a poly (vinylarene) and where B is an elastomeric polymer midblock such as a conjugated diene or a lower alkene polymer. Block copolymers of the A-B-A' type can have different or the same thermoplastic block polymers for the A and A' blocks, and the present block copolymers are intended to embrace linear, branched and radial block copolymers. In this regard, the radial block copolymers may be designated $(A-B)_m-X$, wherein X is a polyfunctional atom or molecule and in which each $(A-B)_m$- radiates from X in a way that A is an endblock. In the radial block copolymer, X may be an organic or inorganic polyfunctional atom or molecule and m is an integer having the same value as the functional group originally present in X. It is usually at least 3, and is frequently 4 or 5, but not limited thereto. Thus, in the present invention, the expression "block copolymer", and particularly "A-B-A'" and "A-B" block copolymer, is intended to embrace all block copolymers having such rubbery blocks and thermoplastic blocks as discussed above, which can be extruded (e.g., by meltblowing), and without limitation as to the number of blocks.

U.S. Pat. No. 4,663,220 to Wisneski et al. discloses a web including microfibers comprising at least about 10 weight percent of an A-B-A' block copolymer where "A" and "A'" are each a thermoplastic endblock which comprises a styrenic moiety and where "B" is an elastomeric poly(ethylene-butylene) midblock, and from greater than 0 weight percent up to about 90 weight percent of a polyolefin which when blended with the A-B-A' block copolymer and subjected to an effective combination of elevated temperature and elevated pressure conditions, is adapted to be extruded, in blended form with the A-B-A' block copolymer. Polyolefins useful in Wisneski et al. may be polyethylene, polypropylene, polybutene, ethylene copolymers, propylene copolymers, butene copolymers, and mixtures thereof.

Commercial examples of such elastomeric copolymers are, for example, those known as KRATON® materials which are available from Shell Chemical Company of Houston, Tex. KRATON® block copolymers are available in several different formulations, a number of which are identified in U.S. Pat. No. 4,663,220, hereby incorporated by reference. Particularly suitable elastomeric polymers are elastomeric poly(styrene/ethylene-butylene/styrene) block copolymers available from the Shell Chemical Company of Houston, Tex. under the trade designations KRATON® G-1657 and KRATON® G-2740.

In the laminate of this invention it has been found that an intermediate layer, such as a meltblown layer, does not appreciably change the strength and softness properties of the final laminate when compared to those without the intermediate layer.

Drape is a measure of the softness of a fabric and refers to how well the fabric conforms to an object over which it is laid. A soft fabric will drape more in conformance with the outline of the object upon which it is draped than will a stiffer fabric. Drape is measured by the Handle-O-Meter test which was previously defined.

The strength of a fabric is measured by the tensile test which was previously defined.

Fabrics made according to this invention have been found to have comparable drape and superior tensile properties as fabrics made from conventional polypropylenes.

The following Control and Examples show the characteristics of fibers from polymers which satisfy the requirements of this invention versus those that do not. All of the samples were bonded with the expanded Hansen-Pennings pattern described above. The results are shown in table 1.

CONTROL

A fabric was produced which was a spunbond/spunbond (SS) laminate. The basis weight of the layers was 1 osy (34 gsm) and 1 osy (34 gsm). Both layers were made from the same low melt flow rate polypropylene: Himont Chemical Co.'s PF-301. The fibers were spun at a temperature of about 390–440° F. (199–221° C.). The spinnerette hole size was 0.6 mm with throughput between 0.5 and 0.7 grams/hole/minute (ghm) to produce fiber of 21 microns in diameter.

EXAMPLE 1

A fabric was produced which was a spunbond/spunbond (SS) laminate. One of the layers was produced from a high melt flow rate polypropylene and the other from a conventional low melt flow rate polypropylene. The basis weight of the layers was 1 osy for the high melt flow rate layer and 1 osy for the low melt flow rate layer. The high melt flow rate polypropylene was produced by the addition of 1000 to 1500 ppm of peroxide to Himont's PF-301 polypropylene. The melt flow rate of the polymer after peroxide treatment was about 110. The high melt flow rate fibers were spun at a temperature of about 390–430° F. (199–221° C.). The spinnerette hole size was 0.6 mm with throughput between 0.5 and 0.7 grams/hole/minute (ghm) to produce fiber of 15 microns in diameter.

The low melt flow rate polypropylene used was Himont's PF-301. The fabric was produced by spinning fibers at the conditions of the Control.

The laminate was produced by first depositing the low melt flow layer onto a forming wire and then depositing the high melt flow polymer layer directly onto the warm low melt flow rate polymer layer.

EXAMPLE 2

A fabric was produced which was a spunbond/spunbond (SS) laminate. One of the layers was produced from a high melt flow rate polypropylene and the other from a conventional low melt flow rate polypropylene. The basis weight of the layers was the same as in Example 1. The high melt flow rate polypropylene was produced by the addition of 0.65 weight percent of an organo-metallic compound to Himont's PF-301 polypropylene. The melt flow rate of the polymer after organo-metallic treatment was 80. The organo-metallic compound used was pthalo-$Fe_2O_3$-cynanine which is available commercially as a blue-grey pigment from the Standridge Chemical Company of Social Circle, Georgia, as SCC6142. After addition, the polypropylene/organo-metallic mixture was thoroughly mixed.

The high melt flow rate fibers were spun at the same conditions as in Example 1 to produce fiber of 12 microns in diameter.

The low melt flow rate polypropylene was Himont' PF-301. The fabric was produced by spinning fibers at the same conditions as in Example 1 to produce fibers of 19.5 microns in diameter.

The laminate was produced by first depositing the low melt flow layer onto a forming wire and then depositing the high melt flow polymer layer directly onto the warm low melt flow rate polymer layer.

EXAMPLE 3

A fabric was produced which was a spunbond/spunbond (SS) laminate. One of the layers was produced from a high melt flow rate polypropylene and the other from a conventional low melt flow rate polypropylene. The basis weight of the layers was the same as in Example 1. The high melt flow rate polypropylene was produced by the addition of 0.65 weight percent of an organo-metallic compound to Himont's PF-301 polypropylene. The melt flow rate of the polymer after organo-metallic treatment was 80. The organo-metallic compound used is designated $Fe_2O_3$/Fe and is available commercially from the Engelhard Corporation. After addition, the polypropylene/organo-metallic mixture was thoroughly mixed. The high melt flow rate fibers were spun at the same conditions as in Example 1 to produce fiber of 15 microns in diameter.

The low melt flow rate polypropylene was a mixture of Himont' PF-301 and Exxon Chemical Company's Escorene® 3445. The fabric was produced by spinning fibers at the same conditions as in Example 1 to produce fiber of 19.5 microns in diameter.

The laminate was produced by first depositing the low melt flow layer onto a forming wire and then depositing the high melt flow polymer layer directly onto the warm low melt flow rate polymer layer.

TABLE 1

| Meter # | Sample Id | Normalized BW | Fiber-Size (microns) | Tensile Cd | Energy Md | Elongation Cd | Handle-0- Cd | Md |
|---|---|---|---|---|---|---|---|---|
| 0 97.7 | Control | 2 | 19–25 | 30 | 60 | 54.3 | 82.8 | |
| 1 94.2 | Example 1 | 2 | 19–25 | 34 | 67 | 74 | 56.4 | |
| 2 82.6 | Example 2 | 2 | 19–25 | 39 | 78.5 | 78.6 | 89.8 | |
| 3 | Exanple 3 | 2 | 19–25 | 38.576 | 76 | 51.1 | 73 | |

The results show that laminates made from fibers spun from polyolefin having the designated characteristics can have greater strength than those from unmodified polymers. Strong polyolefin spunbond webs have not been produced, as far as the inventors are aware, with comparable softness to that of conventional polyolefin spunbond webs in the past.

What is claimed is:

1. A soft and strong nonwoven spunbond polyolefin fabric comprising:
   a first web of spunbond fibers produced from polyolefin polymer having a melt flow rate of at least 50 grams/10 minutes according to ASTM D-1239-90b condition L and a viscosity of at least 2500 dynes.sec/$cm^2$ and;
   a second web of spunbond fibers produced from a polyolefin polymer having a melt flow rate of below 50 grams/10 minutes according to ASTM D-1239-90b condition L;
   wherein said webs are bonded together to form a laminate having a strength at least 10% greater than the same laminate made when said first web polymer melt flow rate does not exceed 50 grams/10 minutes according to ASTM D-1239-90b condition L.

2. The nonwoven fabric of claim 1 further comprising a third layer selected from the group consisting of meltblown webs and films and disposed between said first and second webs.

3. The nonwoven fabric of claim 2 wherein said third layer is a meltblown web which is made from a polymer selected from the group consisting of polyurethanes, polyetherester, polyamides, polyolefins, polyolefin copolymers and mixtures thereof.

4. The nonwoven fabric of claim 2 wherein said third layer is a film which is made from a film forming polymer selected from the group consisting of polyurethanes, polyetherester, polyamides, polyolefins, polyolefin copolymers and mixtures thereof.

5. The nonwoven laminate of claim 2 wherein said first and second web of spunbond fibers comprise polypropylene spunbond fibers.

6. The nonwoven laminate of claim 5 wherein said third layer comprises meltblown fibers comprising polypropylene.

7. The nonwoven laminate of claim 5 wherein said third layer comprises a polypropylene film.

8. The nonwoven laminate of claim 6 wherein said second web of spunbond fibers has a melt-flow rate of about 35.

* * * * *

UNITED STATES PATENT AND TRADEMARK OFFICE
CERTIFICATE OF CORRECTION

PATENT NO. : 6,268,302 B1
DATED : July 31, 2001
INVENTOR(S) : Ofosu et al.

It is certified that error appears in the above-identified patent and that said Letters Patent is hereby corrected as shown below:

Column 10,
Table 1, should read

--

TABLE 1

| # | Sample Id | Normalized BW | Fiber-Size (microns) | Tensile Cd | Energy Md | Elongation Cd | Handle-O-Meter Cd | Handle-O-Meter Md |
|---|-----------|---------------|----------------------|------------|-----------|---------------|-------------------|-------------------|
| 0 | Control | 2 | 19-25 | 30 | 60 | 54.3 | 82.8 | 97.7 |
| 1 | Example 1 | 2 | 19-25 | 34 | 67 | 74 | 56.4 | 94.2 |
| 2 | Example 2 | 2 | 19-25 | 39 | 78.5 | 78.6 | 89.8 | 82.6 |
| 3 | Example 3 | 2 | 19-25 | 38.5 | 76 | 76 | 51.1 | 73 |

--

Signed and Sealed this

Twelfth Day of November, 2002

JAMES E. ROGAN
Director of the United States Patent and Trademark Office

Attest:

Attesting Officer